Sept. 19, 1967 — T. G. COX ET AL — 3,342,011
CONTAINER FILLING MACHINE
Filed Nov. 6, 1964 — 10 Sheets-Sheet 3

FIG_5

FIG_6A

FIG_6B

FIG_6C

FIG_7A

FIG_7B

FIG_7C   FIG_7D

INVENTORS
THOMAS G. COX, WILBER C. BELK,
HANS W. GROTEWOLD
BY Hans G. Hoffmeister
ATTORNEY

United States Patent Office 3,342,011
Patented Sept. 19, 1967

3,342,011
CONTAINER FILLING MACHINE
Thomas G. Cox and Wilber C. Belk, Lakeland, and Hans W. Grotewold, Sebring, Fla., assignors to FMC Corporation, San Jose, Calif., a corporation of Delaware
Filed Nov. 6, 1964, Ser. No. 409,529
11 Claims. (Cl. 53—59)

ABSTRACT OF THE DISCLOSURE

An apparatus for filling containers with oriented citrus fruit segments comprising a reciprocating perforated plate for sorting seeds from crescent-shaped citrus fruit sections, a pair of laterally closely-spaced belts, an endless belt overlying said pair of belts and spaced thereabove a distance less than the height of the citrus fruit segments, a turn-over rod overlying one of the belts of said pair, a plurality of rotatable spindles for spinning a container, and a guide for directing the segments into a spinning container and for acting as a sensing device to detect the height of the segments in the container.

---

This invention relates to the packing of products into containers and more particularly to a machine for filling containers with citrus fruit sections.

Due to the crescent shaped, tapered, cross-section, and relative fragile nature of citrus fruit sections, it has not heretofore been possible to obtain a satisfactorily uniform pack by machine. By "pack" is meant an assemblage of sections within a filled container. In particular, previous machine packs have not achieved an orderly arrangement of the sections, or a uniform weight of the filled containers. If the sections are merely dropped into the container, the fragile sections will break and a non-uniform pack will result causing the containers to vary greatly in weight.

It is therefore, an object of this invention to provide apparatus for obtaining a pack of citrus fruit sections of substantially uniform weight and density in a cylindrical container.

Another object of this invention is to provide a machine which orients a successive number of fruit sections and positions them uniformly throughout a container without damaging the sections.

Another object of this invention is to provide apparatus which automatically feeds, orientates and fills a series of containers with a uniform pack of undamaged fruit sections.

Another object of this invention is to provide apparatus which will convert a random assortment of citrus fruit sections, interspersed with seeds therebetween, into a row of substantially orientated seed-free sections and feed said sections into a series of cylindrical containers, forming in each a pack of approximate uniform density.

Another object is to provide apparatus which will separate a random assortment of citrus fruit sections into three distinct paths, orientate a substantial portion of the sections in a particular orientation, and recombine all the sections into one of the three paths.

The container filling machine of the instant invention produces a substantially uniform pack by feeding a random assortment of sections and seeds to a shaker in which the seeds are removed and then to an orientator where the sections are arranged so that the orientated sections are fed to a container with their thick edges against the outer wall of the container. The container is rotated while being filled at a rotational speed such that the centrifugal force imparted to the sections by the container will result in a frictional resistance force between the sections and the container wall which will be slightly less than the gravitational force acting upon the sections. The sections are directed into the container at an initial velocity which is approximately the same as the tangential velocity of the rotating container so that the sections are retained against the wall of the container and spiral gently downward. In addition to the orientated sections, a substantially uniform percentage of all the sections directed into each can are of such size and shape as to remain unorientated and eventually locate in the center of the container. A rotary, driven presser member compacts the sections when they approach the top of the can so that a substantially uniform density of pack is achieved. A chute which guides the sections against the inside wall of the container additionally acts as a sensing member and regulates the height of the pack in the container. When the container is filled, a series of switches actuate a container-positioning unit which replaces the filled can with an empty one, and the filling cycle is repeated.

The container filling machine comprises several individual and identical processing lanes. The general arrangement and operation of only one of these processing lines will be shown but it is understood that several could be mounted in adjacent relationship to simultaneously fill several containers. A preferred embodiment of one of the processing lines for carrying out the invention is shown in the accompanying drawings in which:

FIGURE 8 is an enlarged fragmentary schematic isometric of the drive system for the processing line.

FIGURE 9 is an enlarged section taken along line 9—9 of FIGURE 1 showing, in phantom lines, a container in a position for filling.

Figure 1:
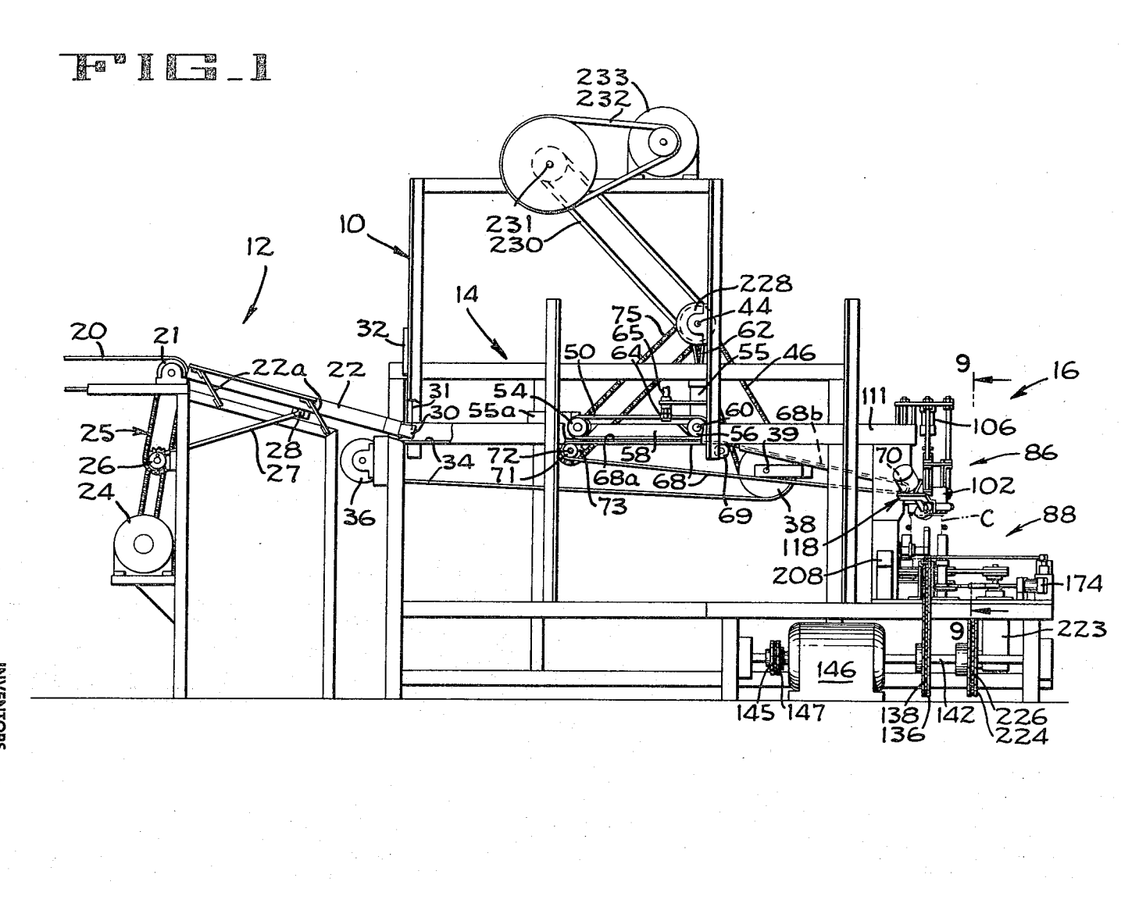
FIGURE 1 is a side elevation of one processing line of a citrus fruit section filling machine with certain parts removed for clarity.
Figures 2, 3, 4:
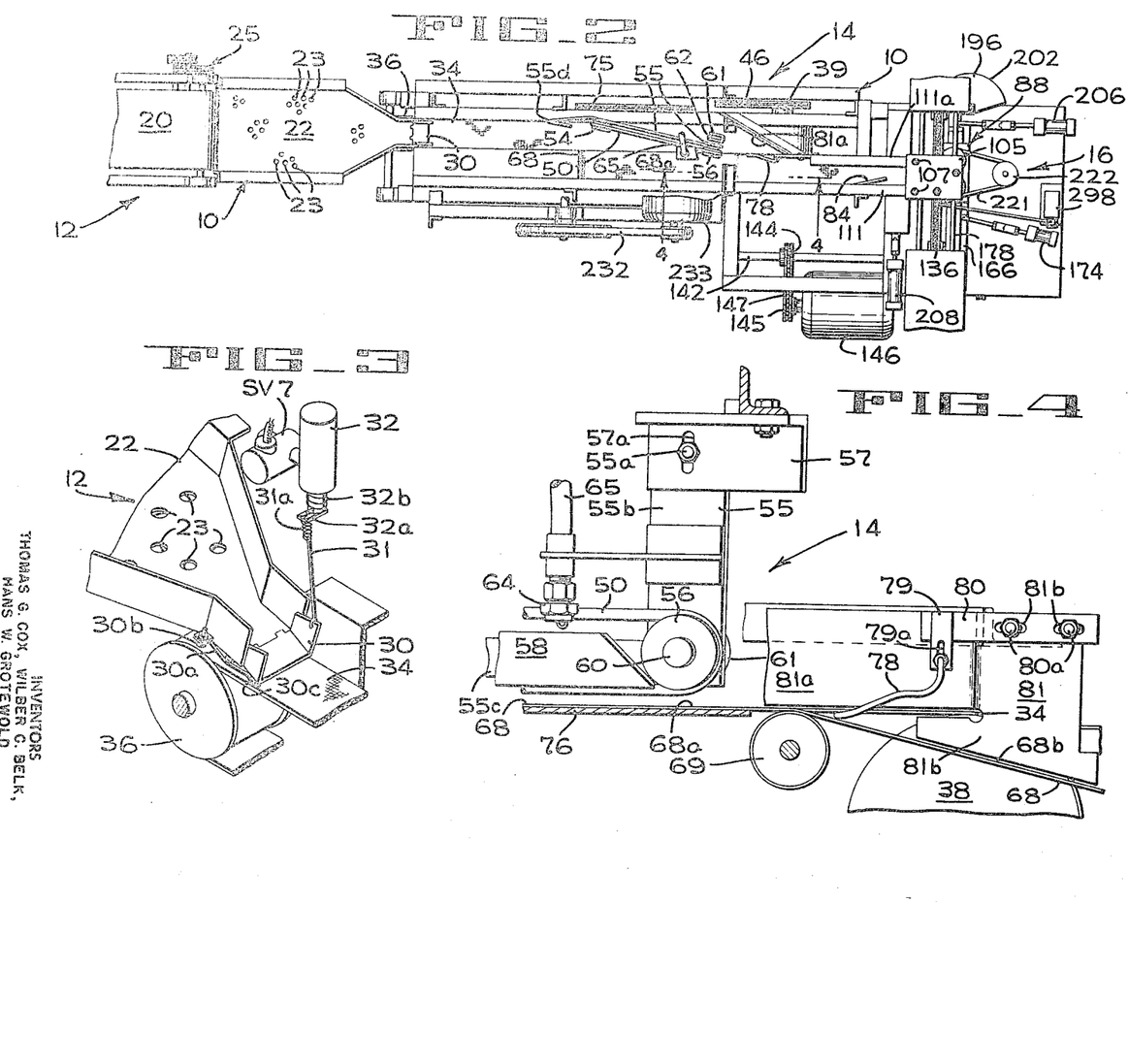
FIGURE 2 is a plan of the processing line shown in FIGURE 1, with parts broken away and parts in section.
FIGURE 3 is an enlarged fragmentary isometric showing the pneumatically actuated gate at the intake end of the processing line.
FIGURE 4 is an enlarged section taken along line 4—4 of FIGURE 2.
Figure 3:
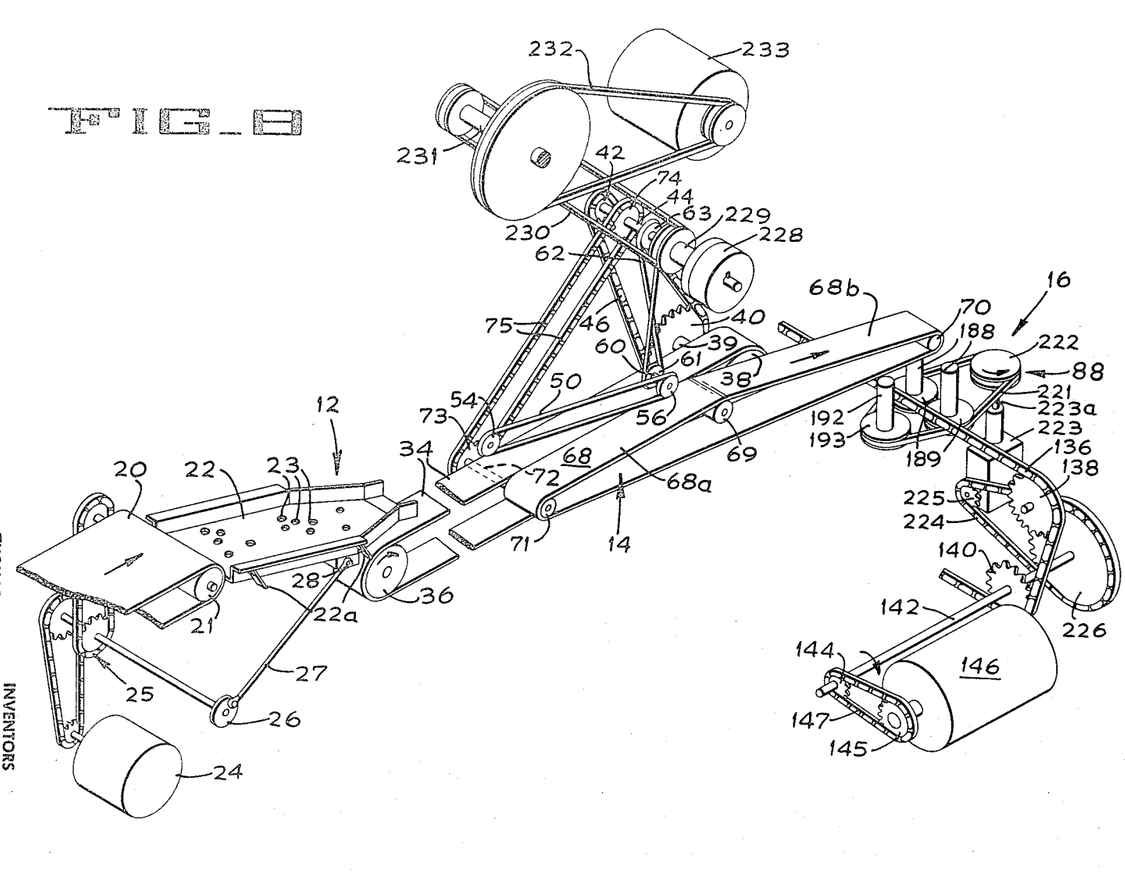

The container filling machine shown in the drawings comprises a frame 10 (FIG. 1) on which is mounted an intake apparatus 12 for presenting a random assortment of articles, such as, grapefruit sections, an orientating apparatus 14, and a filling apparatus 16. The intake apparatus 12 comprises a continuously moving horizontal conveyor belt 20 trained around a driven roller 21 journalled on the frame 10. The intake conveyor 20 transports a random assortment of grapefruit sections, pieces of sections, and loose seeds onto a downwardly inclined shaker and accumulator plate 22 which is reciprocably mounted on the frame for longitudinal vibration by a plurality of leaf springs 22a and is provided with perforations 23 (FIG. 2) so that the seeds fall through the perforations leaving only the unorientated sections. The driven roller 21 is connected to a motor 24 by a suitable drive arrangement, such as a chain and sprocket drive 25. The motor 24 also is connected to a suitable conversion mechanism which changes rotary motion to reciprocating motion, such as, a crank disc 26, a connecting link 27, and a pivot pin 28 mounted on the plate 22 to reciprocate the shaker and accumulator plate 22. On the lower end of the shaker and accumulator plate 22 is hinged a pivotable chute or gate 30 (FIG. 3), biased downwardly by a spring 30a fastened to the bottom of plate 22 by a bolt 30b and fastened to the bottom of the chute 30 by a bracket 30c. In the lowered position of gate 30, sections are free to pass off the plate 22 to the orientating apparatus 14. When the gate is in the raised position, the sections are stopped by the chute 30 and remain on the plate 22. One end of the pivotable chute 30 is fastened by a wire 31 and spring 31a (FIG. 3) to the connecting link 32a of a single acting pneumatic actuator 32 which is energized by a solenoid operated air valve in a manner to be later described. The link 32a is biased downwardly by a spring 32b so that, when the actuator 32 is de-energized, the spring 30a returns the chute 30 to its lowered position. The area of the processing line in the vicinity of the conveyor 20, the shaker and accumulator plate 22, and the gate 30 will be called the intake station.

The orientating apparatus 14 comprises a horizontal feed belt 34 (FIGS. 1 and 2) trained about a roller 36 that is rotatably journalled on the frame adjacent the pivotable gate 30. As is best shown in FIGURE 8, the feed belt 34 is trained around a second roller 38 at its downstream end, the right end as viewed in FIGURE 8, said roller 38 being secured to a shaft 39 on which a sprocket 40 is keyed. The sprocket 40 is coupled to a sprocket 42 mounted on a main drive shaft 44 by a chain 46. The upper run of the feed belt 34 rides on a flat horizontal table not shown connected to the frame 10 which provides a firm level orientating surface. A diagonally positioned rubber O-ring diverter belt 50 is mounted above the feed belt 34 and is trained over an idler pulley 54 and a drive pulley 56. The pulley 56 is fixed to a shaft 60 which is journalled in one end of an L-shaped bar 55 (FIG. 4), which has a vertical leg 55b and a horizontal leg 55c. The bar 55 is vertically adjustablly mounted in a slot 57a in a bracket 57 by a bolt 55a. The bracket 57 is fixed to the frame 10 by any suitable means. The pulley 54 is journalled on a shaft fixed to the free end of the leg 55C of bar 55. Thus the pulleys 54 and 56 and the O-ring belt 50 are suspended solely from a fixed support above the feed belt 34. A deflecter plate 55d is mounted on the end of the bar 55 closest to the gate 30 and moves sections away from the pulley 54 toward the center of the belt 34. A support guide 58 (FIGS. 4 and 5), which is fastened to the bar 55 between the upper and lower tracks of the belt 50, has a lower surface that maintains the lower run of the belt 50 parallel to the upper surface of the feed belt 34. A second pulley 61 (FIG. 8) is fixed to the shaft 60 and is driven by a belt 62 also trained about a pulley 63 (FIG. 8) keyed to the main drive shaft 44. The vertically adjustable mounting of the diverter belt 50 provides for accommodating different types and sizes of citrus fruit sections and to regulate the quantity of sections to be orientated. Mounted on the vertical leg 55b of the bar 55 adjacent the driven end of the diverter belt 50 is a spray nozzle 64 (FIG. 4), coupled to any suitable water conduit 65, which maintains a fine spray of water on the feed belt 34 and on a filler belt 68 (FIG. 2) mounted slightly spaced from the feed belt 34 to assist in sliding sections across the belts.

The filler belt 68 (FIG. 8) is trained about a first idler roller 69, a second idler roller 70, and a driven roller 71 which is keyed to a shaft 72 on which a driven sprocket 73 is secured. The sprocket 73 is connected by a chain 75 to a sprocket 74 that is keyed to the main drive shaft 44. The upper run of the filler belt 68 has a first portion 68a (FIG. 4) that is supported on a horizontal table 76 and travels in the same horizontal plane as the feed belt 34, and a second portion 68b which is inclined downwardly to the lower idler roller 70.

Figure 5:
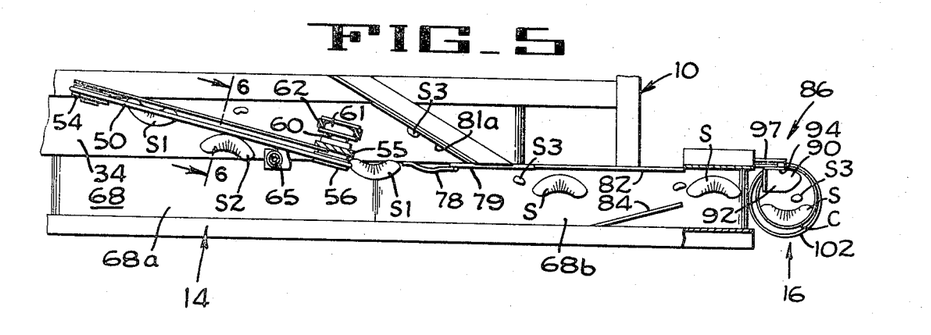
FIGURE 5 is an enlarged diagrammatic plan of a portion of the processing line showing several fruit sections at the orientating and filling stations.
Figure 6A:
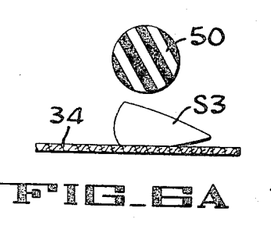
FIGURES 6A–6C are enlarged operational sections taken generally along the lines 6—6 of FIGURE 5, FIGURE 6A showing a thin fruit section passing under the orientator belt, FIGURE 6B showing an unorientated larger section with its thin edge under the belt, and FIGURE 6C showing a section which is properly aligned with its thick edge abutting the belt.
Figure 6B:
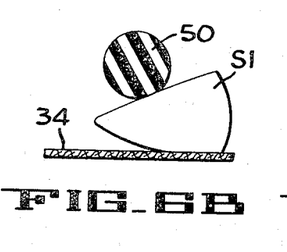
Figure 6C:
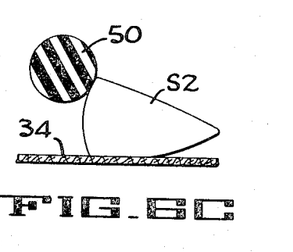
Figures 7A, 7B:
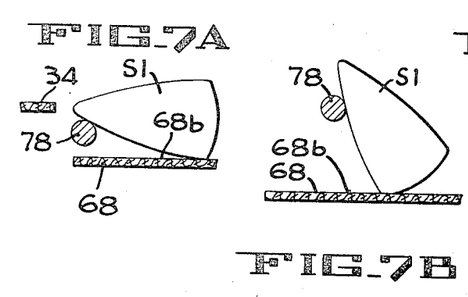
FIGURES 7A–7D are enlarged operational sections showing consecutive positions of a typical fruit section being turned over or orientated.
Figures 7C, 7D:
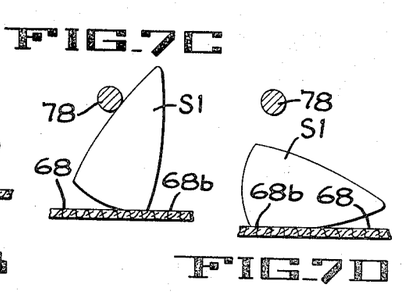

As previously mentioned, the pack of fruit in the container will consist of orientated sections and unorientated pieces of fruit. In general, the orientated sections will be the more or less perfect sections that have a curved edge portion adapted to fit snugly against the curved inner wall of the container as seen in FIG. 5. Mounted downstream of the diverter belt 50 and just above the filler belt 68 is a turnover rod 78 which is effective to orientate sections that are not already orientated. Grapefruit sections S (FIG. 5) which are delivered onto the feed belt 34 progress downstream to the orientating belt 50. The spacing between the lower flight of the diverting belt 50 and the upper surface of the feed belt 34 is, in one successful installation, approximately 5/16 of an inch whereby the grapefruit sections S of normal thickness cannot pass between the belts 34 and 50. Unorientated sections designated as S1 (FIGS. 5 and 6B) can extend their thin edges under the belt 50, but their thickness is such that their thick center portions abut the side of the lower flight of the belt 50 causing them to be moved laterally with the belt 50. A portion of the sections, designated as S2 (FIGS. 5 and 6C), are already orientated and have their thick edges contacting the side of the diverter belt 50 and these sections S2 will be moved laterally further than will the sections S1 which have their thin edges under the diverter belt 50. The sections S2 reach a lateral position upon the horizontal portion of the filler belt 68 whereby they will proceed downstream passing alongside but not engaging the turnover rod 78. The unorientated sections S1, however, will not be diverted far enough laterally to pass freely by the turnover rod 78 and their thin edges will ride up over the upstream end of the rod 78 causing the section S1 to be flipped over about its longitudinal axis as it begins to travel down the downwardly inclined portion 68b of the filler belt 68. The upstream end of the turnover rod 78 extends into the space between the feed belt 34 and the filler belt 68 at the point where the downwardly inclined portion of the filler belt 68 begins. The rod 78 is then angled upwardly and laterally toward the center of the belt 68, and finally is bent laterally away from the center of the belt 68 for clamped engagement in a slot 79a in an adjustment arm 79 which is mounted as by welding on a bracket 80. The bracket 80 is slidably mounted on a diverter wall 81 for horizontal adjusting movement longitudinally of belt 68 by bolts 80a retained in slots 80b. FIGURES 7A through 7D show an operational sequence of a section S1 being flipped over by the turnover rod 78 which plows under the section, lifting the thin edge thereof. As the section progresses with the conveyor 68, the thin edge rides up the rod 78 and simultaneously is moved upwardly and transversely along the laterally angled portion of the rod until the section S1 finally rolls over and falls into an orientated or aligned position with the concave thin edge in the same position as the orientated sections S2 just passing the turnover rod 78. The wall 81 comprises a vertical metal sheet fastened to an angle bar of the frame 10, by any suitable means, downstream of the orientating belt 50 and has a first portion 81a above the feed belt 34. The wall 81 also has a second portion 81b bent at an angle with respect to the portion 81a and extends downwardly into the space between belts 34 and 68 and above the upper surface of the belt 68. The lower end of the wall portion 81a closely confronts the upper surface of the feed belt 34 to assure that no section remaining on the belt 34 can pass beneath. The wall portion 81a diverts the thin sections S3 (FIGS. 5 and 6A) laterally onto the filler belt 68 in random unorientated positions. The area of the processing line in the vicinity of the orientator belt, turnover rod, and diverter wall will be called the orientating station. Since some substantially constant percentage of these thin sections S3 are always present in the total number of incoming sections S, each container pack will ultimately contain about the same number of unorientated thin sections S3.

Figure 10:
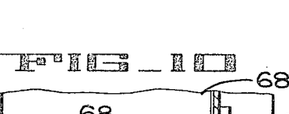
FIGURE 10 is an enlarged horizontal section of another portion of the filling apparatus taken generally along the lines 10—10 in FIGURE 9.

All of the sections S therefore, are passed onto the filler belt 68 where they are guided by guide plates 82 and 84, to the filling apparatus 16, which comprises a filling unit 86 and a container positioning unit 88. The filling unit 86 comprises a sensing member or chute 90, best shown in FIGURES 10, 12 and 13, in the shape of a wedge having a top wall 92, a bottom wall 93, and an upstanding side plate 94. The top wall 92 is bent as at 92a and provides a wall portion which prevents sections from falling between the chute 90 and the belt 68. A lever 97 (FIG. 10) is secured to plate 94 by capscrews 95 and is spaced therefrom by spacers 96. The lever 97 has a rearwardly extending arm 97a that is setscrewed to a switch rod 99 pivotably journalled on the frame 10.

Figures 11, 12:
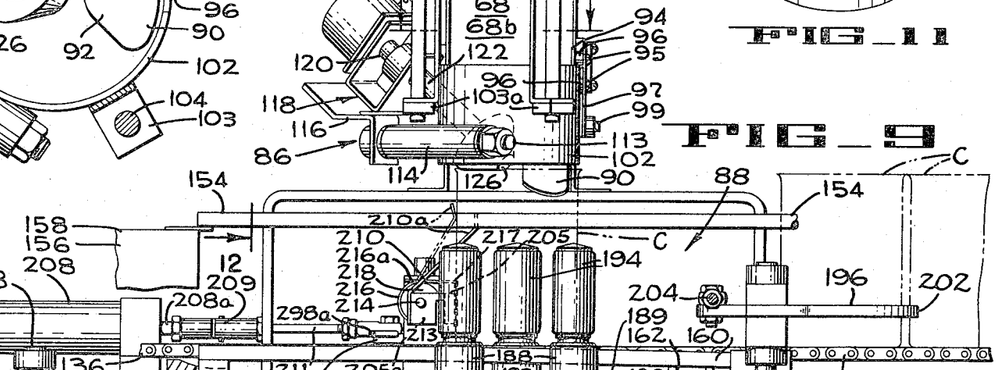
FIGURE 11 is an enlarged isometric of a portion of the container guard in the filling unit shown in FIGURE 9.
FIGURE 12 is an enlarged section of the upper portion of the container filling unit taken substantially along lines 12—12 of FIGURE 9.
Figure 12:
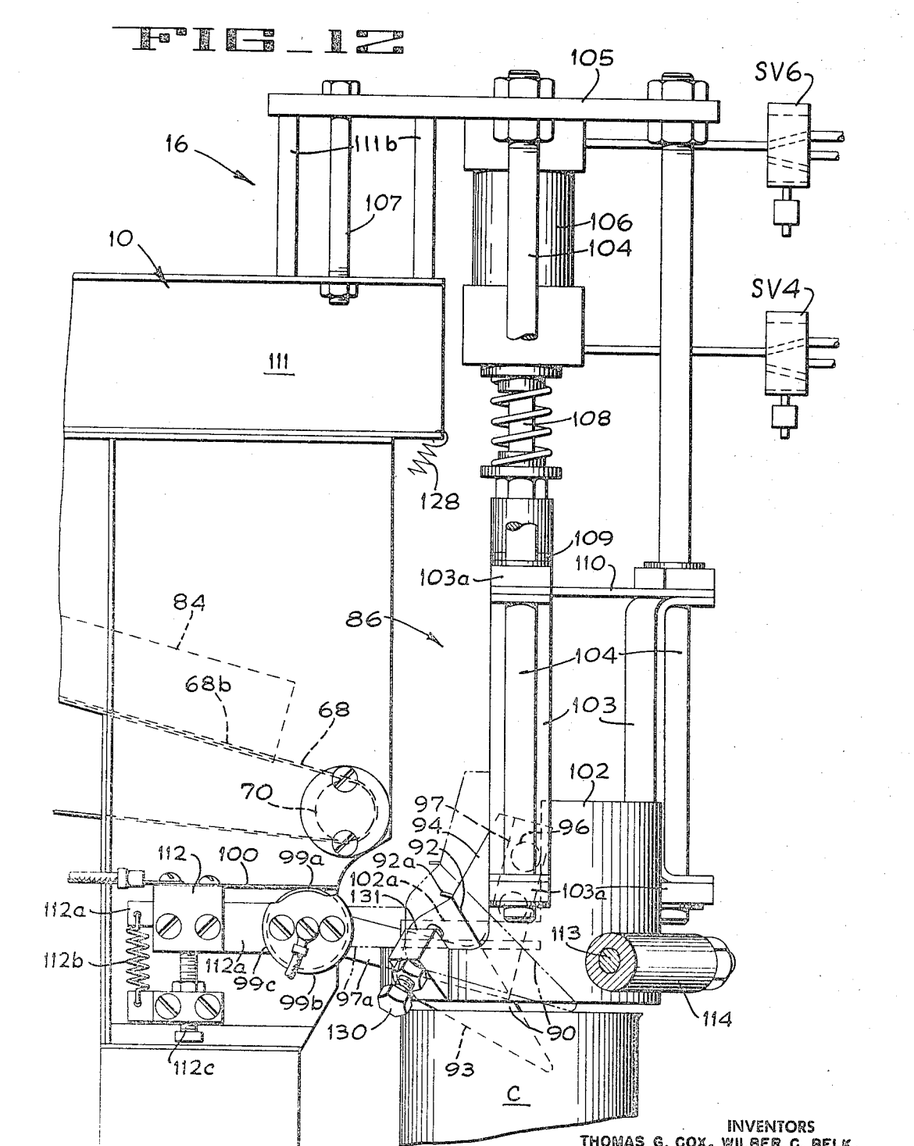

The chute 90 is disposed almost entirely inside a container guard 102 which, as seen in FIGURE 11, is a generally cylindrical member having a large part of one side wall cut away and having an arm 102a projecting generally tangentially to the main cylindrical portion of the guard. Referring to FIG. 12, it will be noted that the lowermost one of the spacers 96 abuts the upper edge of the tangential arm 102a. Accordingly, when the guard 102 is moved upwardly, the arm 102a engages the spacer and pivots the chute 90 upwardly.

The cylindrical container guard 102 has laterally projecting tabs that are welded to a pair of vertical bars 103 that are secured to hubs 103a mounted for vertical reciprocal movement on a pair of guide rods 104 (FIGS. 9 and 12). The guide rods 104 are fixed at their upper ends to a horizontal plate 105 which is mounted on two spaced, longitudinally extending channels 111 and 111a (FIG. 13) of the frame 10 by bolts 107 (FIG. 12) which clamp two vertical transverse plates 111b between the plate 105 and the longitudinal channels 111 and 111a. Vertical movement of the cylindrical container guard 102 is provided by any conventional double acting pneumatic power cylinder or actuator 106 which is energized by solenoid controlled air valves and is identical to all of the double acting pneumatic actuators hereinafter referred to. In general, each actuator includes a piston slidably mounted in a cylinder and having a piston rod projecting outwardly of the cylinder. A solenoid actuated air valve admits high pressure air to one end of the cylinder while the other end of the cylinder is vented. The pneumatic actuator 106 (FIG. 2) associated with the cylindrical guard 102 is secured by capscrews to the underside of the support plate 105, with its piston rod 108 fastened at its lower end to a hub 109 that carries two rigid horizontal support straps 110. As seen in FIGURE 12, the straps 110 are also secured to the hubs 103a so that when air under pressure is directed to the cylinder 106, the can guard will be raised or lowered depending upon which end of the cylinder received the air.

The switch rod 99 which, as aforementioned, is rotatably journalled in the frame 10, has a rotary contact 99a (FIGS. 10 and 12) setscrewed thereto at the opposite side of the belt 68 from the point of attachment of lever arm 97a. A cam 99b which is made of insulating material is secured in coaxial relation to the rotary contact 99a. The cam 99b has a lobe 99c which is arranged to engage a leaf spring contact member 100 to raise it away from the rotary contact member 99a or to permit the member 100 to move down into contact with the periphery of the member 99a. The leaf spring contact member 100 is mounted on an insulated block 112 that is secured to a support lever 112a which has an end portion rotatably supported on the rod 99. A spring 112b urges the lever 112a in a counterclockwise direction (FIG. 12) to hold the block 112 against an adjustable stop screw 112c.

Figures 13, 14:
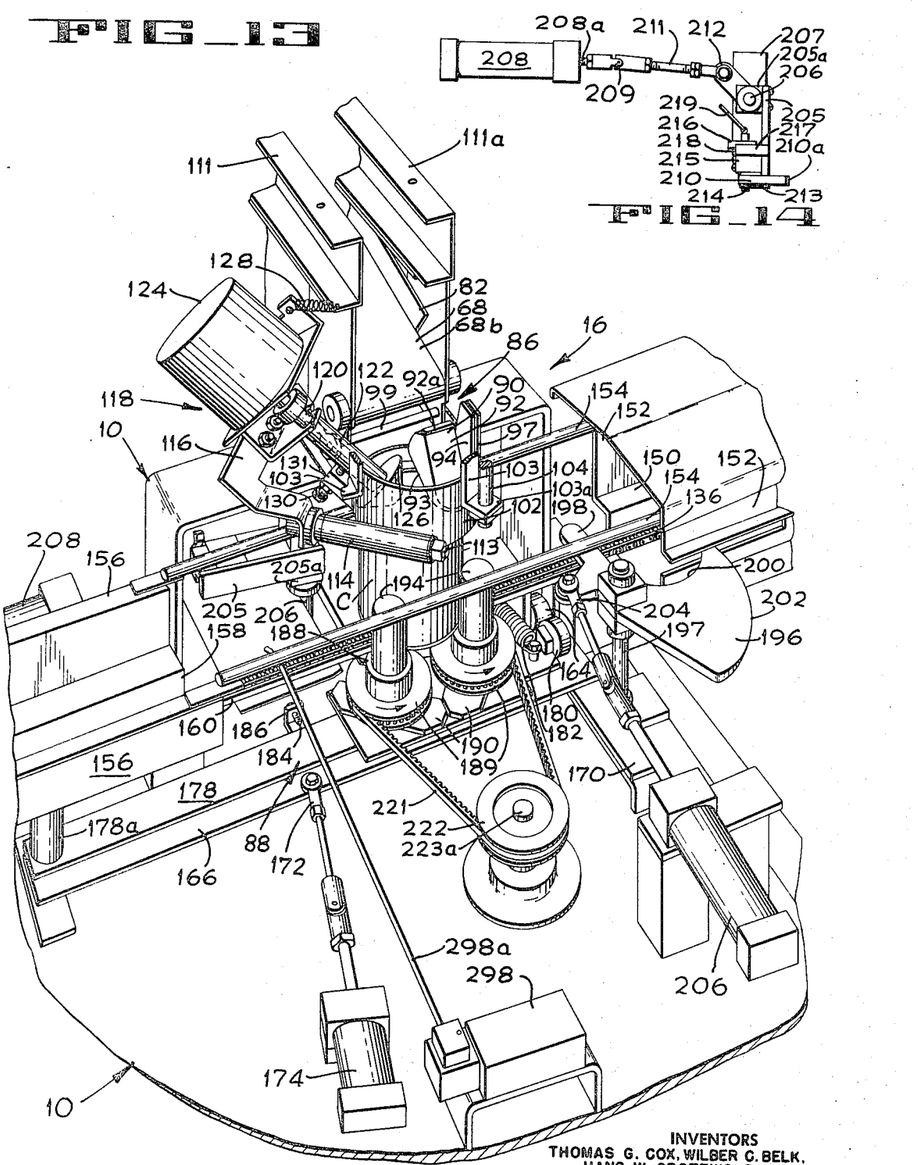
FIGURE 13 is an enlarged perspective of the filling apparatus at the downstream end of the processing line, with parts broken away for clarity and showing a container in filling position.
FIGURE 14 is an enlarged plan of the container stopping bar used in the filling apparatus shown in FIGURE 9, the bar being shown disconnected from the machine.

A cylindrical support shaft 113 (FIGS. 12 and 13) is rotatably journalled in a horizontal tube 114 fixed to the outside of the container guard 102. A support strap 116 is fixed to one end of the shaft and at its other end to a rotary presser mechanism 118. The presser mechanism 118 comprises a shaft 120 journalled in a tube 122 mounted in fixed position on the strap 116 and fastened at its upper end to a small electric motor 124 and at its lower end to a frusto-conical presser roller 126. The lower-most surface of the roller is maintained in a horizontal plane when in its operative position. As is best seen in FIGURE 13, a small spring 128 is fastened to the presser mechanism 118 and to the channel 111 to help support the roller 126 in its horizontal position since the weight of the pressing mechanism 118 tends to pivot it downwardly about the longitudinal axis of the horizontal support shaft 113. The size and strength of the spring 128 is dependent upon the amount of pressure to be applied by the roller. A stop screw 130 is adjustably threaded into a boss 131 (see FIG. 12) integral with the container guard 102 and provides a stop to arrest the downward pivotable movement of the roller 126. By adjusting the stop screw 130, the roller 126 can be extended into the open top of the container guard 102 a desired amount. When a container C is positioned beneath the container guard 102, a switch, later to be described, energizes a circuit to operate a solenoid valve and energize the pneumatic actuator 106, causing the container guide 102 to be lowered and allowing the chute 90 to pivot downwardly into the open upper end of the container C as shown in full lines in FIGURE 12. The roller 126 also moves downwardly until the lower-most surface of the roller 126 lies slightly below the top of the container C at the side of the container guide 102 opposite to the chute 90 as seen in FIGURE 13. Grapefruit sections S, which are discharged from the filler conveyor 68 at a rate of approximately 140 feet per minute, strike the upper surface 92 of the wedge shaped chute 90 and are guided into engagement with the inner cylindrical wall of the rotating container C. Substantially all of the sections are orientated such that their thick edges abut the wall of the container.

Figures 15, 16:
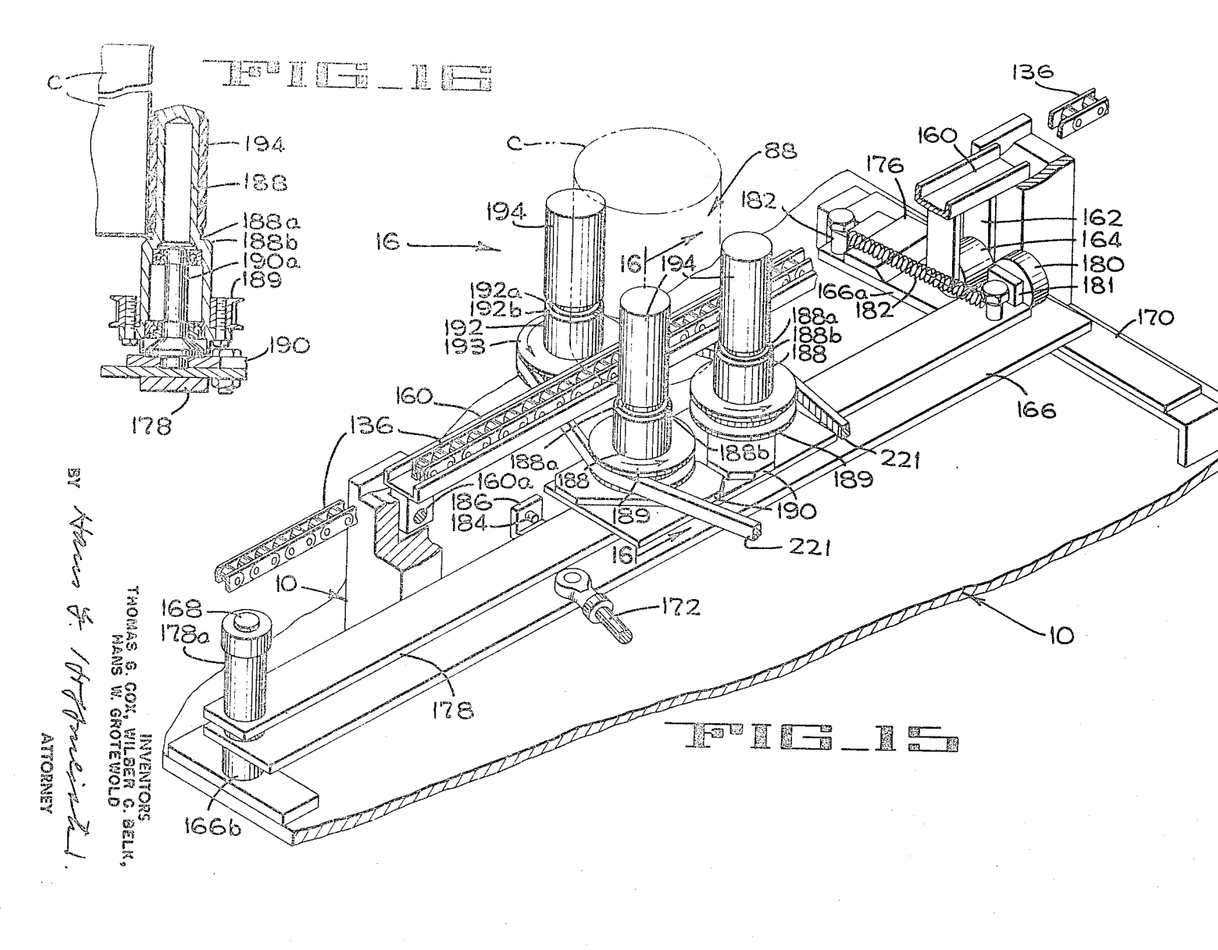
FIGURE 15 is an enlarged schematic isometric of a portion of the apparatus for positioning a container in a container-spinning device used in the filling apparatus.
FIGURE 16 is an enlarged vertical section of one of the spools taken along line 16—16 of FIGURE 15.

The container positioning unit 88 (FIGS. 9, 13 and 15) is disposed just below the filling unit 86 and comprises a horizontal container-carrying chain 136 continuously driven in a direction normal to the direction of travel of the filler belt 68. In the embodiment shown, the chain 136 is trained about a plurality of idler sprockets 138 (FIG. 8, only one shown) and a drive sprocket 140 mounted on a rotary shaft 142. A sprocket 144 is also keyed to shaft 142, said sprocket being connected by a chain 147 to a sprocket 145 mounted on the shaft of a motor 146. The container conveying chain 136 is mounted at one end in an intake guide track 150 (FIG. 13) which includes a pair of side walls 152 that assure proper alignment of the containers C on the container carrying chain 136 as they approach the filling station directly below the guard 102. Fastened to the side walls 152 of the intake guide track 150 in the immediate vicinity of the filling unit 86 are two parallel horizontal guide rods 154 which are spaced apart the same distance as walls 152 and assure proper alignment of the containers C on the carrying chain 136 through the area beneath the filling unit 86. The horizontal guide rods are fastened at their other ends in a like manner to two side walls 156 of a discharge guide track 158 similar to the intake guide track 150 to assure proper alignment of the containers C on the carrying chain 136 after being filled at the filling station.

A chain support bar 160 (FIGS. 9 and 15) is pivotably connected at one end to the frame 10 by a horizontal pin 160a. A post 162 projects downwardly from the chain support bar 160 near its free end, and a freely rotatable roller 164 is mounted on the lower end of the post 162. The roller 164 rests on a leg 166a of an L-shaped cam support lever 166 which has a hub 166b pivotably mounted on a pivot post 168, fastened to the frame 10 beneath the discharge guide track 158. The leg 166a rests on a horizontal bearing strip 170 also fastened to the frame 10. A link 172 is pivotally fastened to the cam support lever 166 approximately midway between its ends and is fastened to a double acting pneumatic actuator 174 (FIG. 13) fastened to the frame 10. The actuator 174 is operated by solenoid controlled air valves which will be described presently. A cam plate 176 is mounted on the upper surface of the leg 166a of the support arm 166 in alignment with the roller 164 supporting the chain support bar 160. Energization of the pneumatic actuator 174 to swing the lever 166 clockwise (FIG. 15) brings the cam plate 176 into engagement with the support roller 164 and swings the chain support bar 160 upward to raise the chain to its container-carrying position. Conversely, when the pneumatic actuator 174 moves the L-shaped cam support lever 166 counterclockwise, the cam plate 176 moves out of engagement with the support roller 164, lowering the chain support bar 160 into a position in which the carrying chain 136 is below its normal container-supporting position. As will appear presently, this chain lowering action takes place when the container arrives at the filling station so that it is no longer moved forwardly by the continuously moving chain.

A spool-carrying arm 178, which is disposed above lever 166 and also has a hub 178a mounted on the pivot post 168 for pivotable movement in a horizontal plane, is supported at its free end by a roller 180 journalled in a block 181 fastened to the free end of the arm 178. The roller 180 rolls along the upper surface of the L-shaped cam support lever 166 and the arm 178 is biased to pivot in a counterclockwise direction by a spring 182 that is fastened to a peg 183 on the cam support arm 166. Intermediate its length, the lever 166 is provided with a stop screw 184 that is mounted on an angle tab 186 which is fastened to the inner edge of the lever 166. The stop screw 184 lies in the same plane as the spool-carrying arm 178 so that clockwise pivoting of the cam support lever 166 will bring the stop screw 184 into engagement with the spool-carrying arm 178 causing both to move simultaneously in a clockwise direction. A pair of rotary can-spinner spools 188 are journalled on posts 190a (FIG. 16) projecting upwardly from plates 190 fixed on the upper surface of the spool carrying arm 178, and a toothed pulley 189 is secured concentrically on each spool. A third rotary spool 192, which carries a toothed pulley 193, is rotatably journalled on a similar, fixed upstanding post. The two spools 188 (see FIG. 15) are circular in cross-section and form the corners of the base of a triangle (when viewed from above) while the spool 192 is elliptical in horizontal cross-section and is positioned at the apex of the triangle. The spools are circumscribed by traction sleeves 194 which provide a frictional surface for engaging the outer cylindrical surface of the cylindrical container C. The cam plate 176 and the stop screw 184 mounted on the L-shaped cam support lever 166 are adjusted so that, when a container is carried by the chain to a position directly under the container guard 102, and the support lever 166 is pivoted counterclockwise (FIG. 15), the cam plate 176 will become disengaged from the support roller 164, lowering the chain support bar 160, while the two outer spools 188 move inwardly toward the empty container C due to the biasing action of the spring 182. The L-shaped cam support lever 166 continues to swing inwardly, disengaging the stop screw 184 from the spool carrying arm 178 and leaving the spools 188 firmly biased by the spring 182 against the container C. Thus, as the chain 136 is lowered, the spinner spools move into engagement with the container.

The spools 188 have annular grooves 188a adjacent a beveled edge 188b, and spool 189 has a groove 192a adjacent a beveled edge 192b. The beveled edges of the spools are slightly above the level of the conveyor chain so that as the spools engage the container, the edges aid in lifting the container from the container carrying chain 136 since the biasing of the two outer spools 118 against the container forces the chime of the container against the inner spool 192 to cause the can to move upward on the beveled edges. When the chime has risen to the top of the beveled edge, it fits snugly within the grooves 188a and 192a in the spools with the wall of the container firmly held by the sleeves 194 on the spools. The engagement of the chime of the can in the grooves 118a and 192a prevents the can from moving upward during spinning. Empty containers C enter the filling station one at a time and in timed relation this movement of the cans from the intake guide track 150 is controlled by a gate member 196 (FIG. 13) that is pivotally mounted on a post 197 for horizontal movement above the can carrying chain 136. The gate member 196 is a generally flat member and is provided with a container stopping arm 198 that is arranged to halt a row of containers carried by the continuously moving container carrying chain 136. Adjacent the container stopping arm 198 is a first curved extension 200 which has a concave surface of a radius slightly larger than the radius of the container. Adjacent the first curved extension 200 is a second curved extension 202 having a convex surface of a radius much greater than the first. A connecting link 204 is connected at one end to the gate member 196 near the container stopping arm 198 and is connected at its other end to a double acting pneumatic actuator 206 (of the type previously described) connected to the frame 10. The pneumatic actuator 206 is energized by solenoid controlled air valves. Thus, when the first empty container engages the container stopping arm 198, the row of empty containers following the first container in abutting relation are halted with the container carrying chain 136 sliding under the containers. When the pneumatic actuator 206 retracts the link 204 and swings the container stopping arm 198 counterclockwise (FIG. 13), the first curved extension 200 is also swung counterclockwise, engaging the first empty container and causing the corner surface of the second curved extension 202 to abut the empty container next in line and prevent it from being advanced. Further pivotal movement of the gate member 196 completely retracts the container stopping arm 198, freeing the trapped container and permitting it to move with the container carrying chain 136 toward the container filling unit 86 while the second curved extension 202 halts the remaining row of containers. Reversing the direction of movement of the link 204 withdraws the second curved extension 202 from its engagement with the row of containers and permits the first container in the row to move into abutment with the container stopping arm 198.

The container C released from the row is carried by the container carrying chain 136 toward a position under the cylindrical can guard 102 until it engages against a stop bar 205 (FIGS. 9 and 14) which, at this time, projects outwardly over the endless chain 136 in the path of movement of the can. The stop bar 205 is mounted on a block 205a that is pivotally supported between set-collars on a cylindrical post 206 projecting upwardly from a fixed plate 207. The piston rod 208a of a double acting pneumatic power cylinder 208 is connected by a universal joint 209 to a link 211 that is pivoted to a lever 212 projecting from the block 205a. When the piston rod 208a is moved inwardly of the cylinder 208, the stop bar 205 is swung counterclockwise (FIG. 14) to its can-intercepting position of FIGURE 9; when the piston rod 208a is moved out of the cylinder, the stop bar is swung clockwise to the position of FIGURE 13, permitting the arrested can to advance on the chain.

A switch control rod 210 (FIG. 9) is mounted on a block 213 that is keyed to a shaft 214 journalled in a support block 215 (FIG. 14) secured to the stop bar 205. The control rod 210 has an end portion 210a (FIG. 9) that projects over the path of the oncoming can and is so positioned that it is engaged by the can before the can engages the stop bar. The shaft 214 has a rotary cam 216 keyed thereto, said cam having a lobe 216a adapted to hold a contact strip 217 in spaced relation above the periphery of a rotary contact 218 that is mounted on the shaft 214. The shaft 214 is connected to ground through a conductor 219 and the contact strip 217, which is mounted on the stop bar 205, has a conductor, not shown, connected thereto. The stop bar 205 is made of any conventional non-conducting material so that the strip 217 is insulated from the machine. Referring to FIGURE 9, it will be seen that, when a can engages the end 210a of the control rod 210, it swings the shaft 214 counterclockwise, permitting the can to move into engagement with the stop bar and causing the rotary cam 216 to allow the contact strip 217 to lower into engagement with the periphery of the rotary contact 218. The closing of these contacts starts a control operation which will be described presently.

All three spinner spools (FIG. 8) are driven by a timing belt 221 which is trained about a toothed drive pulley 222 mounted on a rotatable, vertical shaft 223a and around the spool pulleys 189 and 193. The shaft 223a is mounted in a gear box 223 fastened to the frame of the machine, the gears of which are driven by a drive chain 224 that is trained around a sprocket 225 and around a second drive sprocket 226 mounted on the shaft 142 driven by the motor 146. Since the amount of friction between the articles being fed into a container and the container wall varies depending on the article being handled and the material of the container, the rotational speed required will also vary depending upon the article being handled. The rotational speed must be such that the centrifugal force acting on the article which is imparted by the rotating container will result in a frictional resistance force between the article and the wall of the container which will be slightly less than the gravitational force acting on the article thus causing the article to slide down the container wall. The embodiment shown is for filling grapefruit sections into a No. 301 tin container, which has an outside diameter of approximately 3 3/16 inches. This embodiment is shown for illustrative purposes only, it being understood that the principle of the invention is also applicable for other articles and different size containers made of different materials. Accordingly, the chain drive to the gear box 223 can be modified as desired to obtain the desired speed of rotation of the spools. The spools in the embodiment shown are rotated at a rate of approximately 420 r.p.m. The resultant container rotation is approximately 140 r.p.m., which was found to be the speed required to have a grapefruit section slowly slide down the wall of the tin container, and the lateral shake due to the elliptical shape of the inner spool 192 results in the container being shaken or vibrated at a frequency of approximately 840 vibrations per minute.

Further drive arrangements, as best shown schematically in FIGURE 8 show the filler belt 68, orientator belt 50, and feed belt 34 being driven from the main shaft 44 through an electromagnetic slip clutch 228 which has a driven element attached to the shaft 44 and a drive element attached to a large tubular shaft 229. The shaft 229 is driven through a belt and pulley mechanism 230 by a shaft 231 which, in turn, is driven through a belt and pulley device 232 by an electric motor 233. Accordingly, while the spool drive, the drive for the container carrying chain 136, the drive for the intake conveyor 20, and the shaker and accumulator plate drive are operated continuously, the drive to the filler belt 68, the feed belt 34, and the orientator belt 50 may be halted by virtue of the electromagnetic clutch 228. As mentioned above, the intake conveyor 20, the shaker and accumulator plate 23, the container carrying chain 136, the spools, and the drive to the electromagnetic clutch are started and remain continuously driven during normal operations.

Figures 17A, 17B, 18:
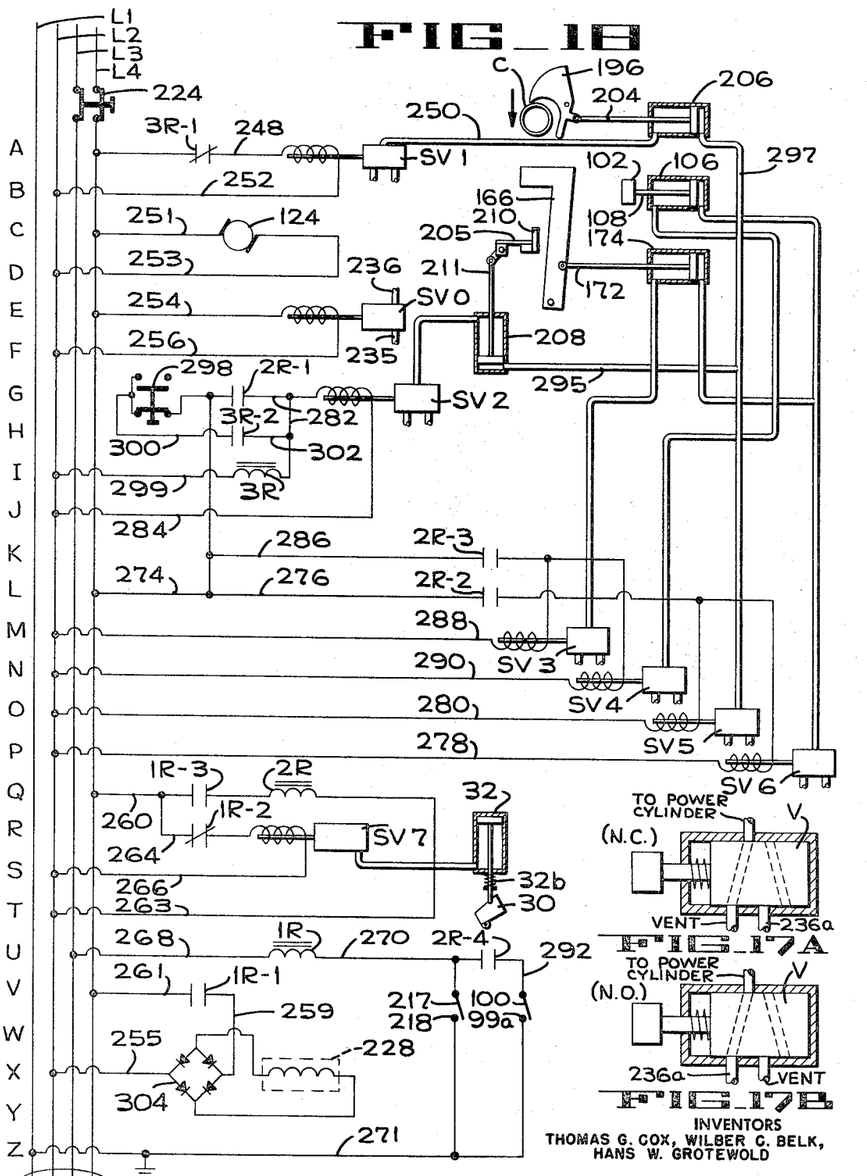
FIGURES 17A and 17B are enlarged schematics showing solenoid actuated air valves, FIGURE 17A showing a valve in a normally closed position, and FIGURE 17B showing a valve in a normally open position.
FIGURE 18 is a diagram of the circuit used for operating one processing line of the invention.

Referring to the control diagram of FIGURE 18, it will be noted that eight solenoid-operated, air flow control valves SV0–SV7 are shown. Valve SV1 in line A of the diagram is associated with the air conduit to one end of the pneumatic actuator or power cylinder 206 that actuates the gate 196, valve SV5 in line O being connected in the conduit leading to the other end of the cylinder 206. Valve SV0 in line E controls the flow of air from a conduit 235 connected to a source of air under pressure to a supply conduit 236 that is connected to each of the valves SV1–SV7. Valve SV2 in line G is connected in a conduit leading to one end of the power cylinder 208 associated with the can stop bar 205, valve SV5 in line O being connected in the conduit leading to the other end of the cylinder 208. Valve SV3 in line M is connected in the air conduit leading to one end of power cylinder 174 which controls the cam support lever 166, valve SV6 in line P being connected in the conduit leading to the other end of the cylinder 174. Valve SV4 in line N is connected in the conduit leading to one end of cylinder 106 that raises and lowers the container guard 102, valve SV6 in line P being connected in the conduit leading to the other end of cylinder 106. Valve SV7 in line R is connected in a conduit leading to one end of power cylinder 32 that is effective when energized to raise the gate 30 and permit further grapefruit sections to be delivered onto the feed belt 34.

Each of the valves SV1–SV7 is of the type, shown in FIGURES 17A and 17B, in which a solenoid is effective when energized to shift the spool of the valve toward the left to a position communicating the conduit that directs air to the associated power cylinder with either a vent connection or with a conduit 236a that is connected to the supply conduit 236 connected to the master valve SV0.

In referring to the valves in the control diagram, the term "normally closed" will be used to refer to a valve which has its inlet and vent connections located as shown in FIGURE 17A which illustrates a "normally closed" valve. When the solenoid is in a normal or de-energized condition, the conduit leading to the power cylinder communicates through a slanted passage in a valve element V with a vent connection. When the solenoid is energized, the valve element V is shifted to the left to communicate the power cylinder conduit with one of the supply conduits 236a.

A "normally open" valve is shown in FIGURE 17B and it will be noted that it differs from a "normally closed" valve only in that the vent connection and the air supply conduit 236a are reversed. Thus, when the solenoid is in a normal, de-energized condition, the power cylinder communicates through the valve element V with the air supply conduit 236a and, when the solenoid is energized, the power cylinder is vented.

In the control diagram of FIGURE 18, conductors L1–Lr are connected to a source of electric power in such a manner that a circuit between L1 and L3 will be subjected to 24-volt AC current and a circuit between L2 and L4 carries 115-volt AC current. To begin a cycle of operation a selector switch 244 is turned to ON position to close contacts in the lines L3 and L4, and a valve (not shown) is opened to direct air under pressure to the master valve SV0. The normally closed, solenoid-operated air valve SV1 in line A is energized through conductors 248 and 252, whereupon the valve is opened and air is directed through conduit 250 to one end of power cylinder 206. Since the other end is vented through SV5 in line O, the piston is moved in a direction to rotate the gate member 196 and retract the container stopping arm 198, releasing one container while the remainder are halted by the second curved extension 202. Simultaneously therewith, the rotary presser motor 124 in line C is started through circuit 251, 253 for continuous operation. Also, through circuit 254 and 256, the normally closed main air valve SV0 in line E is opened to supply air to the other valves SV1–SV7 including: the normally open valve SV2 in line G which energizes the pneumatic actuator 208 to swing the stop bar 205 and switch rod 210 over the container carrying chain 136 to a container stopping position; the normally open valve SV3 in line M which energized the pneumatic actuator 174 which retracts the cam support lever 166 to raise the chain carrying bar 160 and moves the spool-carrying bar 178 away from the filling unit 86; and the normally open valve SV4 in line N which energizes the pneumatic actuator 106 to raise the cylindrical guard 102, the rotary presser 118, and the sensing member or chute 90. Hence an empty container C is free to travel on the carrying chain 136 to a position beneath the cylindrical guard 102. At this time, the contact points 99a and 100 in line V that are associated with the sensing member or chute 90 are also opened. Also simultaneously therewith, the solenoid of the normally closed solenoid operated air valve SV7 in line R is energized through circuit 260, 264, 266 and the valve is opened causing the single-acting pneumatic actuator 32 to raise the gate 30 and stop the fruit sections from passing off the shaker and accumulator plate 22.

When an empty container C reaches the filling station beneath cylindrical guard 102, it moves into engagement with the stop bar 205, while actuating the switch rod 210 to cause the contact points 217 and 218 in line V to close and simultaneously start the following operations: the time delay relay 1R in line U is energized through the 24 volt circuit 268, 270, 271 closing relay contacts 1R–1 in line V and IR–3 in line Q and opening relay contacts 1R–2 in line R; the clutch 228 in line X is energized through the circuit 255, 259, 261 to start the operation of the filler belt 68, the feed belt 34, and the orientator belt 50; when contact 1R–2 in line R is opened, the circuit 260, 264, 266 is broken, de-energizing the solenoid of valve SV7, allowing the valve to be vented and permitting the spring 32b to return the piston of the pneumatic actuator 32 and the spring 30a to lower the gate 30 starting the flow of sections S toward the orientating apparatus 14; the four-pole relay 2R in line Q is energized through circuit 260, and 263. The four-pole relay 2R in line Q being energized, the contacts 2R–1 in line G, 2R–2 in line L, 2R–3 in line K, and 2R–4 in line U are closed and the following simultaneous operations occur: the solenoids of the normally open valves SV2 (line G), SV3 (line M), and SV4 (line N) are energized through circuits 274, 282, 284; 274, 286, 288 and 274, 286, 290, respectively, and the valves are closed; also, the solenoids of the normally closed valves SV5 (line O) and SV6 (line P) are energized to open through circuits 274, 276, 280 and 274, 276, 278, respectively, and these valves are opened. Opening of valve SV6 causes the pneumatic actuator 174 to move the cam support arm 166 inwardly, lowering the container carrying chain 136 and permitting the spring biased spool carrying bar 178 to move the beveled spools 188 under the container and lift it off the lowered chain 136. With the valve SV4 now closed and valve SV6 open, air also energizes the pneumatic actuator 106, lowering the cylindrical guard 102, the rotary presser roller 126, and the sensing chute 90 into an operative position. When the sensing chute 90 is lowered, the contacts 99a and 100 are closed and set up a holding circuit through the circuit 268, 270, 292, 271 to keep relay 1R energized. Since valve SV2 is now closed or vented and valve SV5 is opened, air is directed through conduit 295 to the pneumatic actuator 208 to retract the stop bar 205 and the switch rod 210 carried by bar 205 to a position parallel to the container carrying chain 136, and air is directed through conduit 297 to the pneumatic actuator 206 for rotating the gate member 196 and returning the container stopping arm 198 to its operative position permitting the row of empty containers to move into engagement therewith. Retraction of the switch rod 210 opens the contacts 217 and 218; however, since the holding circuit through contacts 99a and 100 is still closed, the relay 1R remains energized.

Simultaneously with the preceding operation, the two-pole relay 3R in line I is energized through circuit 274, 282, 299 and the following operations occur: contact 3R–1 in line A is opened, breaking the circuit 248, 250, 252 to the solenoid of valve SV1, and valve SV1 returns to its normally closed position, permitting the pneumatic actuator 206 to be moved by air admitted through conduit 297 and valve SV5, as mentioned above; contact 3R–2 in line H is closed and the circuit 274, 300, 302, 282, 299 forms a holding circuit for the two-pole relay 3R through normally closed contacts of a reset switch 298 which, as seen in FIGURE 13, has an actuator rod 298a disposed in the path of movement of a can toward the can discharge section 158.

The container C is now being filled with grapefruit sections S leaving the filler conveyor 68 at a velocity of approximately 140 feet per minute and are guided by the chute 90 against the inside cylindrical wall of the shaking and rotating container C where the orientated sections S1 and S2 slowly slide downward in a pack with their thick edges adjacent the container wall. Smaller pieces and unorientated sections S3 do not remain against the wall since they tend to topple to the center of the container due to their thin edges losing contact with the spinning wall. In other words, since thin sections or broken pieces are unorientated, they strike the container wall in random positions, such as, at the points of their crescent shaped thin edges, and fall to the center of the container.

As the container is filled, the sections build up and raise the sensing member or chute 90. When the chute 90 is raised it pivots the rod 99 (FIG. 12) and at a predetermined level, substantially as shown in phantom lines in FIGURE 12, opens the contact points 99a and 100 (line V). This breaks the holding circuit 268, 270, 292, 271 and thereby de-energizes the time delay relay 1R. The time delay 1R may be of any commercial type, for example, the type manufactured by the Allen-Bradley Company, Milwaukee, Wis., having an off-delay with one set of auxiliary points. The set of contacts 1R–3 in line Q are delayed-action contacts that are closed after the ½ second delay, the other sets of contacts 1R–1 in line V and 1R–2 in line R are not delayed-action contacts and they act immediately upon energization or de-energization of relay 1R.

Once the time delay relay 1R is de-energized the following simultaneous operations occur on the non-time relay side; contacts 1R–1 in line V are opened and the circuit 255, 259, 261 is broken and the rectifier 304 and electromagnetic clutch 228 are de-energized, disengaging the clutch 228 to stop the orientator belt 50, the feed belt 34 and the filler belt 68; contacts 1R–2 in line R are closed and through circuit 260, 264, 266 the solenoid of the normally closed valve SV7 is energized to open the valve, and the gate 30 is raised to halt the flow of sections S from the shaker and accumulator plate 22. Sections S coming onto the plate 22 pile up or accumulate at the gate 30. For the duration of a pre-set time delay, approximately equal to the time for one rotation of the container or ½ second, the contacts 1R–3 remain closed, 2R remains energized, and the filled container C is held at the filling station for further pressing with the presser roller 126. At the end of the delay period, contacts 1R–3 open and relay 2R is de-energized, permitting the filled container to be carried away from the filling station.

The time delay contacts 1R–3 of relay 1R are effective to prevent the container from being carried out of the machine before it is filled, as when one section S extends higher than any of the others, in a partially filled container, and lifts the chute 90 to open the contacts 99a and 100. Since this one section will pass out from under the chute and allow the contacts 99a and 100 to close before the ½ second time delay, the container will not be discharged and the filling process will continue until the sections S in a properly filled container again raise the sensing chute and re-open the limit switch points 99a and 100. When the chute 90 is raised for the one full rotation of the container, (in other words, after the pre-set delay period has expired) the contacts 1R–3 is also opened and the circuit 260, 263, 266 is broken, de-energizing the four-pole relay 2R and the following simultaneous operations occur: the contacts 2R–2 in line L are opened and the circuit 274, 276, 280 is broken, the solenoid of valve SV5 is de-energized and the valve returns to its normally closed position; circuit 274, 276, 278 is also broken and the solenoid of valve SV6 is de-energized and the valve returns to its normally closed position; the contacts 2R–3 in line K are opened and the circuit 274, 286, 288 is broken to de-energize the solenoid of valve SV3 and return the valve to its normally open position. Air is fed to the pneumatic actuator 174 to retract the spool carrying arm 178 and the cam support lever 166, and lift the container carrying chain 136 causing the filled container C to be moved toward the discharge guide track 158 and the reset switch rod 298a; the circuit 274, 286, 290 also is broken and the solenoid of valve SV4 is de-energized to return it to its normally open position. Air is fed thus to the pneumatic actuator 106 to raise the cylindrical container guard 102, the presser roller 126, and the sensing chute 90. The contacts 2R–1 are opened and the circuit 274, 282, 299 is broken, but the solenoid of valve SV2 remains energized through the circuit 274, 300, 302, 282, 284 and the stop bar 210 and contacts 217 and 218 remain in retracted position. The circut 248, 252 remains broken due to the holding circuit 274, 300, 302, 299 holding the relay 3R energized to keep contacts 3R–1 open, thus, valve SV1 remains in the normally closed position, and the pneumatic actuator 206 keeps the gate 196 in its extended position with the arm 198 stopping the row of containers.

When the filled container, now travelling toward the discharge guide track, 158 deflects rod 298a and actuates the re-set switch 298 the following simultaneous operations occur: the holding circuit 274, 300, 302, 299 is broken and the two-pole relay 3R is de-energized; with relay 3R de-energized contacts 3R–1 in line A are closed to close the circuit 248, 252, and energize the solenoid of valve SV1, whereby air is admitted to pneumatic actuator 206 to retract the gate 196 and release another container; the circuit 274, 300, 302, 282, 284 is broken, the solenoid of valve SV–2 is de-energized, and the valve SV2 returns to its normally open position. The pneumatic actuator 208 is energized to extend the stop arm 205 and the switch rod 210 again into the path of the oncoming empty container. Thus the processing line is again started on another filling cycle.

From the foregoing description it can readily be seen that the processing line of the present invention effectively arranges a variety of different size citrus fruit sections into an orderly arrangement and places the sections into cylindrical containers in packs of substantially identical density. It should be noted, that by providing the gate 30 for stopping the sections upstream of the feed belt 34, the sections are more readily introduced to the orientating apparatus in spaced relation thus precluding several sections from striking the belt 50 simultaneously and possibly affecting the orientating operation. The invention further has the advantage of filling containers with very little breakage or damage to the sections. Although the machine has been described for use with citrus fruit sections, it should be noted that the principles embodied in the invention have utility for processing other objects. For example, longitudinally cut pickle sections could be oriented on the orienting apparatus, and the filler could be used to place a variety of other objects, such as, shrimps or tea bags in the containers.

Figure 19:
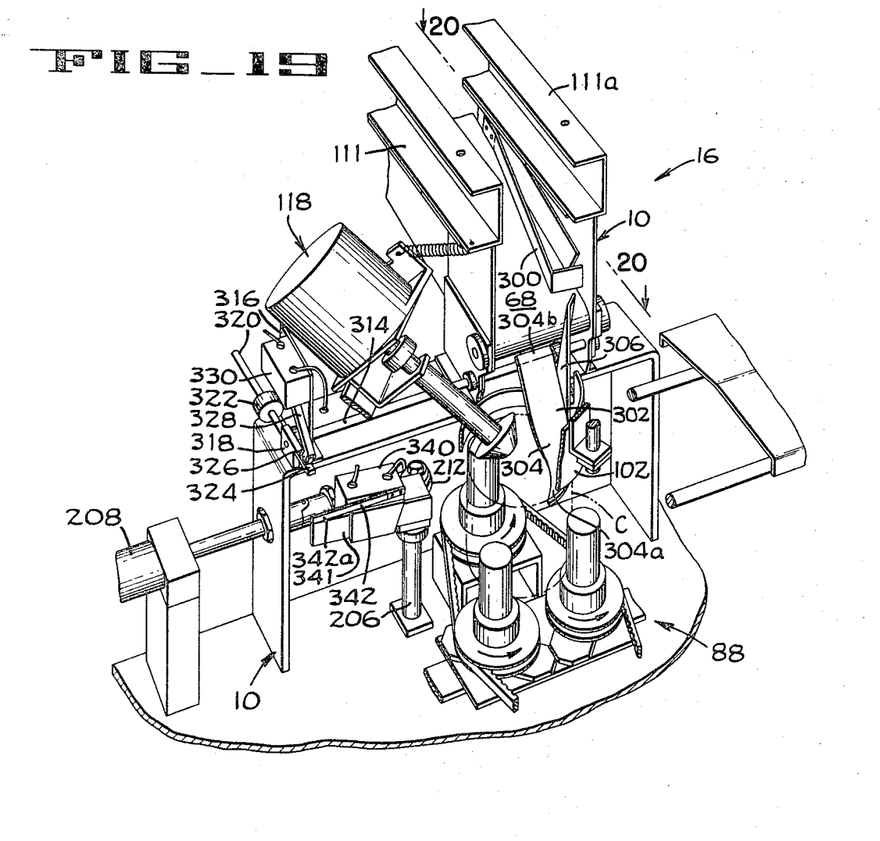
FIGURE 19 is an enlarged schematic perspective of a modified portion of the processing line, with parts broken away for clarity.
Figure 20:
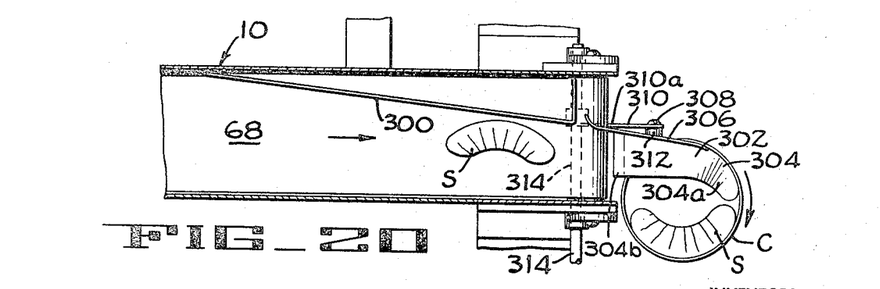
FIGURE 20 is an enlarged horizontal section taken along line 20—20 of FIGURE 19, with parts broken away for clarity.

A modified form of the filling apparatus is shown in FIGURES 19 and 20. Generally the apparatus is identical to the embodiment previously described except that the container C is positioned in an off-set position to receive sections tangentially admitted into the container from the filler belt 68 and certain other elements have been slightly changed. The tangential admission of the sections into the container is accomplished by guiding the sections along a line tangent to the container wall. A deflector plate 300 is mounted on the frame 10 closely confronting the upper surface of the filler belt 68 and is angled so as to contact the thick edge of the citrus fruit sections and divert the sections toward the center of the belt 68. The container guard 102 is mounted for reciprocating movement in a vertical plane in a position off-set from the center line of the filler belt 68 and is otherwise identical to the previously described embodiment. A modified sensing member or chute 302, having a bottom wall 304 and an upstanding side wall 306, is disposed almost entirely in the guard 102 and is pivotably mounted for movement into the container C a distance such that the lower tip of the bottom wall 304 is approximately ¾ inch below the upper edge of the container. The bottom wall is bent as at 304b to provide a surface which prevents articles from falling between the chute 302 and the belt 68 and a lower end 304a that is bent to conform to the inner wall of the container and is twisted so that its surface is inclined downwardly and inwardly toward the center of the container. The side wall 306 has secured thereto by capscrews 308, a lever 310 spaced from the wall 306 by spacers 312. The lever 310 has a rearwardly extending arm 310a that is setscrewed to a switch rod 314 pivotably journalled on the frame 10.

The switch rod 314, which, as aforementioned, is rotatably journalled in the frame 10, extends away from the belt 68 and is also journalled in an upstanding plate 316 mounted on the frame 10. A block 318 is setscrewed to the end of the rod 314 farthest from the belt 68 and has a shaft 320 fixed thereto which extends rearwardly therefrom. A small weight 322 is slidably mounted on the shaft 320 which tends to pivot the rod 314 and block 318 in a counterclockwise direction. Thus, the weight 322 serves to partially offset the weight of the chute 302 and makes the chute sensitive to upward pressure causing it to readily pivot the rod 314 in the frame 10. Also, fastened to the top of the block 318 is a cam arm 324 which extends forwardly of the block 318 and supports a cam follower roller 326 journalled to one end of an actuator 328. The actuator 328 is pivotably mounted at its opposite end in a switch 330 which houses a pair of contacts. The actuator 328 is fastened to one of said contacts in a manner such that pivotable movement of the block 318 in a counterclockwise direction will cause the cam follower to roll on the cam arm 324 and cause the actuator 328 to pivot upwardly and close the contacts in the switch 330. Thus, when the chute 302 pivots downwardly into the container, the contacts in the switch 330 are allowed to close whereas upward movement of the chute 302 will open the contacts. Adjustment of the contacts to open and close at a predetermined position of the chute 302 in the container is provided by the setscrew mounting of the block 310 to the rod 314. Thus, by releasing the block 318, the chute 302 can be raised to a predetermined position without rotating the block 318. When the position is reached the block is again securely fastened to the rod 314 whereby further upward movement of the chute will open the contacts. Closing of the contacts in the switch 330 starts a control operation identical to the operation in the embodiment previously described.

Since the container guard 102 and its associated structure is off-set with respect to the center of the filler belt 68, the container positioning unit 88 is likewise off-set an equal amount. The container positioning unit 88 is identical to the previously described embodiment with the exception of a modified switch 340 and a modified bar 341. The switch 340 has a switch control rod 342 pinned thereto at one end and has an end portion 342a that projects over the path of the oncoming container and is so positioned that it is engaged by the container before the container engages the stop bar 341. When the container engages the end 342a of the rod 342, it closes a pair of contacts in the switch 340 and starts a control operation identical to the operation in the embodiment previously described.

The main advantage in the modified apparatus is in the manner of admitting sections S into the container C. As best shown in FIGURE 20, a section S travels on the belt 68 and is deflected by the plate 300 toward the center of the belt. Since most of the sections on the belt 68 are in an orientated position, only the thick edges of these sections will engage the deflector plate 300.

As the deflector palte 300 is disposed along a line which is tangent to the container, the sections deflected by the plate 300 are discharged from the belt 68 and admitted tangentially into the container. The tangential admission assists in guiding the sections against the inside cylindrical wall of the spinning container wherein the section slowly slides downwardly in the container in the same manner as was described in the previous embodiment.

While a preferred apparatus for carrying out the invention has been shown and described, it will be understood that it is capable of modification and variation while still operating according to the principles of the invention. It is to be understood, therefore, that the scope of the invention should be limited only by the scope and proper interpretation of the claims appended hereto.

Having thus described the invention, that which is believed to be new and for which protection by Letters Patent is desired is:

1. An apparatus for filling a container with a plurality of fruit sections having tapered cross-sections including thick edges and thin edges comprising means for supplying a random assortment of said sections, orientating means mounted on said frame in a position for receiving said sections from said supplying means including means for separating said sections into at least two rows, said separating means including an even support surface and deflecting means spaced above said even support surface a predetermined distance sufficient to permit the thin edges of the fruit sections to pass thereunder but to preclude passage of their thick edges, means in a first of said rows for aligning the sections in that row into positions similar to the sections in a second of said rows, means for transferring said sections of said first row into said second row, and means mounted in a position for receiving said sections in said second row for directing said sections into a container.

2. The container filling apparatus as defined in claim 1 wherein said orientating means includes a feed conveyor, a filler conveyor, and an endless orientating belt adjustably mounted above at least one of said conveyors and at an oblique angle to the longitudinal axis thereof, said belt having a lower run parallel to said conveyors and spaced therefrom a predetermined distance such that sections having their thin edges confronting said orientating belt are directed into said first row and sections having their thick edges confronting said orientating belt are directed into said second row, and means for moving said conveyors and said belt whereby said sections carried by said feed conveyor are directed by said orientating belt into one of said rows.

3. The container filling apparatus as defined by claim 2 wherein said aligning and transferring means includes a rod adjustably positioned in the path of said sections in said first row, said rod including a first portion extending upwardly and laterally from the path of said sections whereby sections in said first row ride up on said rod and are flipped thereby about their longitudinal axis into said second row in said positions similar to the sections in said second row.

4. The container filling apparatus as defined by claim 2 including diverting means downstream of said orientating belt whereby sections passing beneath said belt are combined with said sections deflected by said belt.

5. Apparatus for orientating food products comprising means for separating a random assortment of food products having tapered cross-sections defined by thin edges and thick edges into a plurality of spaced rows, said separating means including a first belt mounted for movement in a horizontal plane, a second belt mounted adjacent said first belt for movement in said horizontal plane, an endless belt adjustably mounted above said first belt, said endless belt having a lower run positioned for movement at an angle with respect to the longitudinal axis of said first belt, means for adjusting the height of said lower run of said endless belt a predetermined distance above said first belt such that a first portion of said products will have their thin edges confronting said lower run and will be moved thereby into a first row, a second portion will have their thick edges confronting said lower run and will be moved thereby into a second row, and a third portion will pass beneath said lower run, means for aligning the products in said first row into positions similar to the positions of said products in said second row, means for transferring the products passing beneath said lower run into said second row whereby all of said portions are in said second row with said first and second portions being aligned in similar positions.

6. Orientating apparatus as defined by claim 5 wherein said means for transferring the products passing beneath said lower run includes a wall mounted at an oblique angle with the longitudinal axis of said first belt and in closely confronting relation therewith.

7. Orientating apparatus as defined by claim 5 including a nozzle mounted above said first belt and adjacent said endless belt, and means for connecting said nozzle to a source of liquid for providing a flow of liquid to said nozzle whereby said nozzle directs a fine spray of said liquid on said first belt for decreasing the frictional resistance between said food products and said first belt.

8. A machine for filling containers with a random assortment of fruit sections comprising a first conveyor for supplying a plurality of fruit sections interspersed with seeds, said fruit sections having tapered cross-sections defined by thin edges and thick edges, a downwardly inclined seed removing plate reciprocably positioned for receiving said sections from said supplying conveyor, said plate having seed removing holes provided therein such that seeds passing down said plate fall through said holes leaving only fruit sections remaining on said plate, a gate pivotably mounted to the lower end of said plate for movement into a first section-stopping position and a second position for passing said sections, a feed conveyor mounted in a horizontal plane positioned for receiving said sections from said plate, an endless belt mounted for adjustment in a vertical direction and having a lower run, said lower run being parallel to said feed conveyor and at an oblique angle with respect to the longitudinal axis thereof, said run being positioned to intercept a portion of said sections and separate said portion into a first and second row, means for moving said endless belt, a filling conveyor lying in the same plane as said feed conveyor and in juxtaposition thereto, means mounted adjacent to and above said filling conveyor for aligning said sections in said first row into positions similar to said sections in said second row, means for transferring all of said sections into said second row, filling means positioned to receive all of said sections for directing said sections against the inner wall of a rapidly spinning container, means for continuously moving said supplying conveyor and spinning said container and reciprocating said plate, means for intermittently moving said feed conveyor, endless belt, and filling conveyor, means for sensing the height of said sections in said container, said intermittently moving means including a clutch responsive to said sensing means whereby said clutch disengages the drive to said belt and conveyors when a container is filled, and means for raising said gate to stop the flow of sections from said plate, said means for raising the gate also being responsive to said sensing means.

9. Apparatus for filling containers with fruit sections having thick and thin edges comprising a frame; means mounted on said frame for supplying a random assortment of fruit sections; means mounted on said frame in a position for receiving sections from said supplying means and orientating substantially all of said sections into a row of similarly positioned sections, said orienting means including a movable, substantially flat surface, means overlying said surface and spaced therefrom a distance less than the heights of the largest fruit sections encountered but greater than the thickness of the thinnest edges of the smallest fruit sections encountered for engaging the fruit sections, said fruit section engaging means having an end against which the fruit sections pass whereby fruit sections moving into said engaging means will underlie said engaging means as they pass against said end if their thin edges are toward said engaging means but fruit sections moving into said engaging means will not underlie said engaging means as they pass against said end if their thick edges are toward said engaging means; and means mounted on said frame in a position to receive said orientated sections for filling a series of empty containers with said sections.

10. Apparatus for filling containers with crescent shaped fruit sections having tapered cross-sections defined by convex and concave edges comprising a frame, means mounted on said frame for supplying a random assortment of said sections, means mounted on said frame in a position for receiving said sections from said supplying means for orientating substantially all of said sections into similar positions in a row, means mounted on said frame in a position for receiving said orientated sections for filling a series of empty containers with said sections, said filling means including means for rapidly spinning said containers and means for guiding said sections into said rapidly spinning containers whereby the convex edges of said sections are directed against the inner wall of said containers and slowly slide down thereon to form a pack of substantially uniform weight and density in each container.

11. An apparatus for filling a container with segmented sections comprising a frame, means mounted on said frame for supplying a random assortment of said sections, said supplying means including a conveyor for moving said sections and means movable to a first position for stopping said sections and to a second position for passing said sections, orientating means mounted on said frame in a position for receiving said sections from said supplying means and positioning said sections in a single row with substantially all of said sections being orientated in the same direction, means for filling a container with a predetermined quantity of said sections, said filling means including means for sensing said predetermined quantity of said sections within said container being filled; said stopping means being moved into said section stopping position responsive to said sensing means when said sections reach said predetermined quantity in the container being filled.

References Cited

UNITED STATES PATENTS

| | | | |
|---|---|---|---|
| 2,460,212 | 1/1949 | Bickley | 198—33 |
| 2,775,268 | 12/1956 | Eckart | 141—168 X |
| 3,024,889 | 3/1962 | Reading | 198—33 |
| 3,180,476 | 4/1965 | Marasso et al. | 198—33 |

TRAVIS S. McGEHEE, *Primary Examiner.*